US008595118B2

(12) United States Patent
McGarel et al.

(10) Patent No.: US 8,595,118 B2
(45) Date of Patent: *Nov. 26, 2013

(54) METHOD AND SYSTEM FOR SELECTING SECURITIES FOR AN INVESTMENT PORTFOLIO

(71) Applicants: David McGarel, Western Springs, IL (US); Robert Hensley, Wheaton, IL (US); Chris Peterson, Arlington Heights, IL (US); Dan Waldron, Naperville, IL (US)

(72) Inventors: David McGarel, Western Springs, IL (US); Robert Hensley, Wheaton, IL (US); Chris Peterson, Arlington Heights, IL (US); Dan Waldron, Naperville, IL (US)

(73) Assignee: First Trust Portfolios L.P., Wheaton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,046

(22) Filed: Oct. 29, 2012

(65) Prior Publication Data

US 2013/0054490 A1   Feb. 28, 2013

Related U.S. Application Data

(63) Continuation of application No. 13/072,928, filed on Mar. 28, 2011, now Pat. No. 8,301,538, which is a continuation of application No. 12/352,403, filed on Jan. 12, 2009, now Pat. No. 7,949,591.

(60) Provisional application No. 61/020,667, filed on Jan. 11, 2008.

(51) Int. Cl.
*G06Q 40/00*   (2012.01)

(52) U.S. Cl.
USPC ............................. 705/36 R; 705/35; 705/37

(58) Field of Classification Search
None
See application file for complete search history.

(56) References Cited

U.S. PATENT DOCUMENTS 6,317,726 B1 *   11/2001   O'Shaughnessy ......... 705/36 R
7,099,838 B1 *   8/2006    Gastineau et al. ......... 705/36 R (Continued)

OTHER PUBLICATIONS

SEC Info—First Trust Exchange-Traded Alphadex Fund, et al.—N-1A/A—on Mar. 14, 2007; www.secinfo.com; Mar. 14, 2007, 3-pages (Excerpt).*
Barclays Global Investors Announces the Launch of the First Style-Based International Exchange Traded Funds for U.S. Inventors: Business Wire: Aug. 5, 2005; 2 pages.

(Continued)

*Primary Examiner* — Gregory Johnson
(74) *Attorney, Agent, or Firm* — McAndrews, Held & Malloy, Ltd.

(57) ABSTRACT

Methods and systems for selecting and weighting securities for an actively managed exchange-traded fund. An initial selection of stocks includes domestic or international stocks, which are selected based at least in part on market capitalization. Each stock is scored using a plurality of growth and value factors to generate one or more growth scores and one or more value scores. A selection score is determined for each stock, and the stocks are ranked according to selection scores. A predetermined amount of stocks are eliminated from the stock portfolio based on selection score ranking, and the remaining stocks are split into a plurality of sub-groups. A stock portfolio is generated by weighting the remaining stocks according to the sub-groups they are in, with each stock being equally weighted within its sub-group. An exchange-traded fund is offered to consumers based on the stock portfolio.

14 Claims, 3 Drawing Sheets

(56) References Cited

U.S. PATENT DOCUMENTS

| | | | |
|---|---|---|---|
| 7,206,760 B1* | 4/2007 | Carey et al. ............... | 705/35 |
| 7,558,751 B2 | 7/2009 | Sauter et al. | |
| 7,593,878 B2* | 9/2009 | Blitzer et al. ............... | 705/35 |
| 7,769,653 B2 | 8/2010 | Rousseau et al. | |
| 7,895,110 B1* | 2/2011 | Bleier ............... | 705/36 R |
| 2002/0052820 A1 | 5/2002 | Gatto | |
| 2002/0107770 A1* | 8/2002 | Meyer et al. ............... | 705/36 |
| 2002/0116310 A1 | 8/2002 | Cohen et al. | |
| 2005/0060254 A1* | 3/2005 | Jones ............... | 705/36 |
| 2005/0246255 A1 | 11/2005 | Rousseau et al. | |
| 2007/0299787 A1 | 12/2007 | Shelor et al. | |
| 2008/0243721 A1 | 10/2008 | Joao | |
| 2009/0307148 A1* | 12/2009 | Cardoza et al. ............ | 705/36 R |

OTHER PUBLICATIONS

Israelsen, Craig L., Drift Happens, Financial Planning, v. 29, n. 11, Nov. 1999, 6 pages.
Style and de Stijl, or Morningstar and Mondrian: Use and Misuse of Style Boxes: Journal of Investing, v. 14, no. 4, Dec. 2005, 14 pages.
Schiffres, Manuel, Thinking Outside the Box, Kiplinger's Personal Finance Manual Funds, Spring 2006, 5 pages.
Introducing the New S&P U.S. Style Indices; Standard & Poor's, Oct. 6, 2006, 6 pages.
SEC Info—First Trust Exchange-Traded Alphadex Fund, et al., N-1A/A—on Mar. 14, 2007; www. secinfo.com; Mar. 14, 2007, 3 pages (excerpt).
SEC Info—First Trust Exchange-Traded Alphadex Fund, et al., N-1A/A—on Mar. 14, 2007; www. secinfo.com; Mar. 14, 2007, 7 pages (excerpt).

* cited by examiner

METHOD AND SYSTEM FOR SELECTING SECURITIES FOR AN INVESTMENT PORTFOLIO

RELATED APPLICATIONS

This application is a continuation of co-pending U.S. application Ser. No. 13/072,928, filed Mar. 28, 2011, which is a continuation of U.S. application Ser. No. 12/352,403, filed Jan. 12, 2009 and is related to and claims priority from U.S. Provisional Patent Application Ser. No. 61/020,667, filed Jan. 11, 2008, both of which are incorporated herein by reference in their entirety.

BACKGROUND OF THE INVENTION

The presently described technology generally relates to the selection and weighting of securities for investment portfolios, and more specifically to methods for selecting and weighting stocks for actively managed exchange-traded funds.

Conventional Mutual Funds and Exchange-Traded Funds

As compared to individual securities, mutual funds (such as stock funds) that include many holdings have the advantage of providing the fund owner with diversification of assets, which tends to lessen volatility and the risk of a large loss. However, conventional mutual funds do not offer intraday liquidity like individual securities and cannot be actively bought and sold on an exchange throughout the course of a trading day. This limitation was addressed by the introduction of exchange-traded funds (ETFs). ETFs, which must be registered under the Investment Company Act of 1940, allow investors to buy and sell (and short sell) equity interests in a "basket" of securities on an intraday basis, in the same manner as individually listed securities.

Index-Based ETFs and Actively Managed ETFs

Market indexes are generally designed to measure the aggregate performance of a group of financial instruments, such as securities (e.g., stocks and bonds) or futures contracts. Generation of a market index typically involves selecting financial instruments based on a set of selection criteria, then weighting those instruments based on a weighting scheme. Selection criteria for an equity index, for example, may include a combination of stock characteristics such as market capitalization, whether the stock is domestic or international, and growth and value factors. Weighting schemes may likewise be based on various characteristics of the securities, or may simply accord equal weight to all securities selected for the index. "Weighting," as used herein, refers to a method of assigning a proportionate value to securities within a given index or fund.

Some market indexes are commercially available. Commercially available indexes are maintained and published by providers such as Standard & Poor's (e.g., the Standard & Poor's 500 index, or "S&P 500") and Dow Jones & Company (e.g., the Dow Jones Industrial Average, or "DJIA"). Investment companies may offer investors shares of "index-based ETFs" with holdings and allocations that correspond closely to a particular commercially available index. In all cases, index-based ETFs seek investment results that simply attempt to "track" a commercially available index such as the S&P 500 or the DJIA. Tracking can be achieved, for example, by replication or representative sampling of the index's securities in the index-based ETF. More recently, some indexes have gone from broad representation of a market segment to more narrowly focused and alpha-seeking indexes. "Alpha" is an indication of how much an investment outperforms (positive alpha) or underperforms (negative alpha) a benchmark index.

Investment companies may also offer investors shares of "actively managed" ETFs. Generally, a fund is actively managed if it does not seek to track the performance of a particular commercially available index. Actively managed ETFs thus do not attempt to track a particular index, but instead use their own, independent selection and weighting strategies in an attempt to outperform a selected benchmark. The selection and weighting strategy of an actively managed ETF may be a fixed and repeatable set of steps, a more subjective process involving the fund manager, or a combination of both. Therefore, an ETF may be considered "actively managed" even if the holdings in the underlying investment portfolio are selected and weighted based on fixed, repeatable algorithms that require no human input. Conversely, an ETF is considered to be "index-based" even if it does not precisely mirror the holdings and allocations of a particular index, so long as it seeks investment results that track or enhance the performance of the index.

Although their expense ratios may be higher, actively managed ETFs can have certain advantages over index-based ETFs. For example, active management may allow better control of the balance between volatility and risk in a portfolio. As another example, active management may allow better control of the degree of diversification in a portfolio. And depending on the degree of one's belief in the "efficient market theory," actively managed funds may enable a portfolio to focus on market segments that are more likely to outperform the general market.

Previously, only index-based ETFs have been available and approved for public offering by the SEC. Available index-based ETFs have included SPDR Trust Series 1 ("SPY"), based on the S&P 500 Index, and iShares Russell 3000 Index Fund ("IWV"), based on the Russell 3000 Index.

BRIEF SUMMARY OF THE INVENTION

The present invention provides computer-implemented methods for selecting and weighting stocks of a portfolio for an actively managed exchange-traded fund (ETF).

One embodiment of the invention provides a method for selecting and weighting securities for an actively managed exchange-traded fund using a computer system. Information of an initial selection of securities is input into a database, wherein the information includes identity, growth data and value data of each stock in the initial selection of securities as of a selection date, wherein the initial selection of securities consists of one of domestic stocks and international stocks, and wherein the initial selection of securities is selected based at least in part on market capitalization. In some embodiments, the initial selection of securities is selected from a group consisting of the 200 largest domestic stocks based on market capitalization and the 200 largest international stocks based on market capitalization.

Each stock in the database is scored using a plurality of growth and value factors to generate one or more growth scores and one or more value scores for each stock. In some embodiments, the plurality of growth factors comprise, or are selected from the group consisting of, price appreciations, 1-year sales growth and price-to-sales ratio, and the plurality of value factors comprise, or are selected from the group consisting of, price-to-book ratio, price-to-cash flow ratio and return on assets. In some embodiments the step of scoring each stock includes assigning a growth rank to each stock for each growth factor, assigning a value rank to each stock for each value factor, summing up all growth ranks of each stock to generate a raw growth score for each stock, ranking the stocks based on raw growth scores, summing up all value ranks of each stock to generate a raw value score for each stock, and ranking the stocks based on raw value scores.

A selection score is determined for each stock. In some embodiments, the selection score of each stock is equal to the better of its rank based on its raw growth score and its rank based on its raw value score. In some embodiments, the selection score of each stock is set equal to the better of a final growth score and a final value score, wherein the final growth scores are based on the raw growth score ranks and a quantitative style overlay, and wherein the final value scores are based on the raw value score ranks and the quantitative style overlay.

The stocks in the initial selection of securities are ranked based at least in part on selection scores, and a predetermined amount of the lowest ranking stocks are eliminated. In some embodiments, the predetermined amount of the lowest ranking stocks to be eliminated is the bottom 25%. The remaining stocks are divided into a plurality of sub-groups. In some embodiments, the remaining stocks are divided into sub-groups based on at least one of raw growth ranks, raw value ranks and selection score ranks. A stock portfolio is generated by weighting the remaining stocks according to the sub-groups they are in, wherein each stock is equally weighted within its sub-group. In some embodiments, the sub-groups are quintiles based on at least one of raw growth ranks, raw value ranks and selection score ranks. The top ranked quintile of remaining stocks may receive 5/15 of the weight within the stock portfolio, with successive quintiles of remaining stocks receiving 4/15, 3/15, 2/15 and 1/15 of the weight within the stock portfolio, respectively.

An exchange-traded fund is offered to consumers based on the stock portfolio. In some embodiments, the stocks in the stock portfolio are reconstituted and rebalanced periodically.

Another embodiment of the invention provides a computing system for selecting and weighting securities for an actively managed exchange-traded fund, the computing system comprising a processor and a memory storing a set of instructions adapted to be executed by the processor. The set of instructions is arranged to store information of an initial selection of securities in a database, wherein the information comprises identity, growth data, and value data of each stock in the initial selection of securities as of a selection date, wherein the initial selection of securities consists of one of domestic stocks and international stocks, and wherein the initial selection of securities is selected based at least in part on market capitalization.

The set of instructions is also arranged to score each of the stocks in said database using a plurality of growth and value factors to generate one or more growth scores and one or more value scores for each stock. In some embodiments, the plurality of growth factors are selected from the group consisting of price appreciations, 1-year sales growth and price-to-sales ratio, and wherein the plurality of value factors are selected from the group consisting of price-to-book ratio, price-to-cash flow ratio and return on assets. In some embodiments, the set of instructions is further arranged to assign a growth rank to each stock for each growth factor, assign a value rank to each stock for each value factor, sum up all growth ranks of each stock to generate a raw growth score for each stock, rank the stocks based on raw growth scores, sum up all value ranks of each stock to generate a raw value score for each stock, and rank the stocks based on raw value scores.

The set of instructions is also arranged to determine a selection score for each stock. In some embodiments, the selection score of each stock is set equal to the better of its raw growth score rank and its raw value score rank. In some embodiments, the selection score of each stock is set equal to the better of its final growth score and its final value score, wherein the final growth scores are based on the raw growth score ranks and a quantitative style overlay, and wherein the final value scores are based on the raw value score ranks and the quantitative style overlay.

The set of instructions is also arranged to rank the stocks in the initial selection of securities based at least in part on selection scores, to eliminate a predetermined amount of the lowest ranking stocks, and to divide the remaining stocks into a plurality of sub-groups.

The set of instructions is also arranged to generate a stock portfolio by weighting the remaining stocks according to the sub-groups they are in, wherein each stock is equally weighted within its sub-group.

A method and computer system of the present invention consistently identifies and selects stocks from an initial selection of stocks. The invention identifies stocks within the initial selection of stocks that provide heightened potential for capital appreciation. In accordance with at least one embodiment, the presently described technology is itself inherently passive. In accordance with this embodiment, no active judgment is made when the method or the computing system is evaluating stocks, and each step in the process is driven by a transparent, repeatable quantitative process.

BRIEF DESCRIPTION OF THE SEVERAL
VIEWS OF THE DRAWINGS

DETAILED DESCRIPTION OF THE INVENTION

Various exemplary embodiments of the present invention are discussed in detail below. While specific implementations are discussed, it should be understood that this is done for illustration purposes. Other components and configurations may be used without departing from the spirit and scope of the present invention.

The presently described embodiments relate to portfolio construction and management for an actively managed ETF. Embodiments of the present technology include methods and computer systems for generating stock portfolios for an actively managed ETF using a plurality of growth factors and a plurality of value factors to rank each stock.

Figure 1:
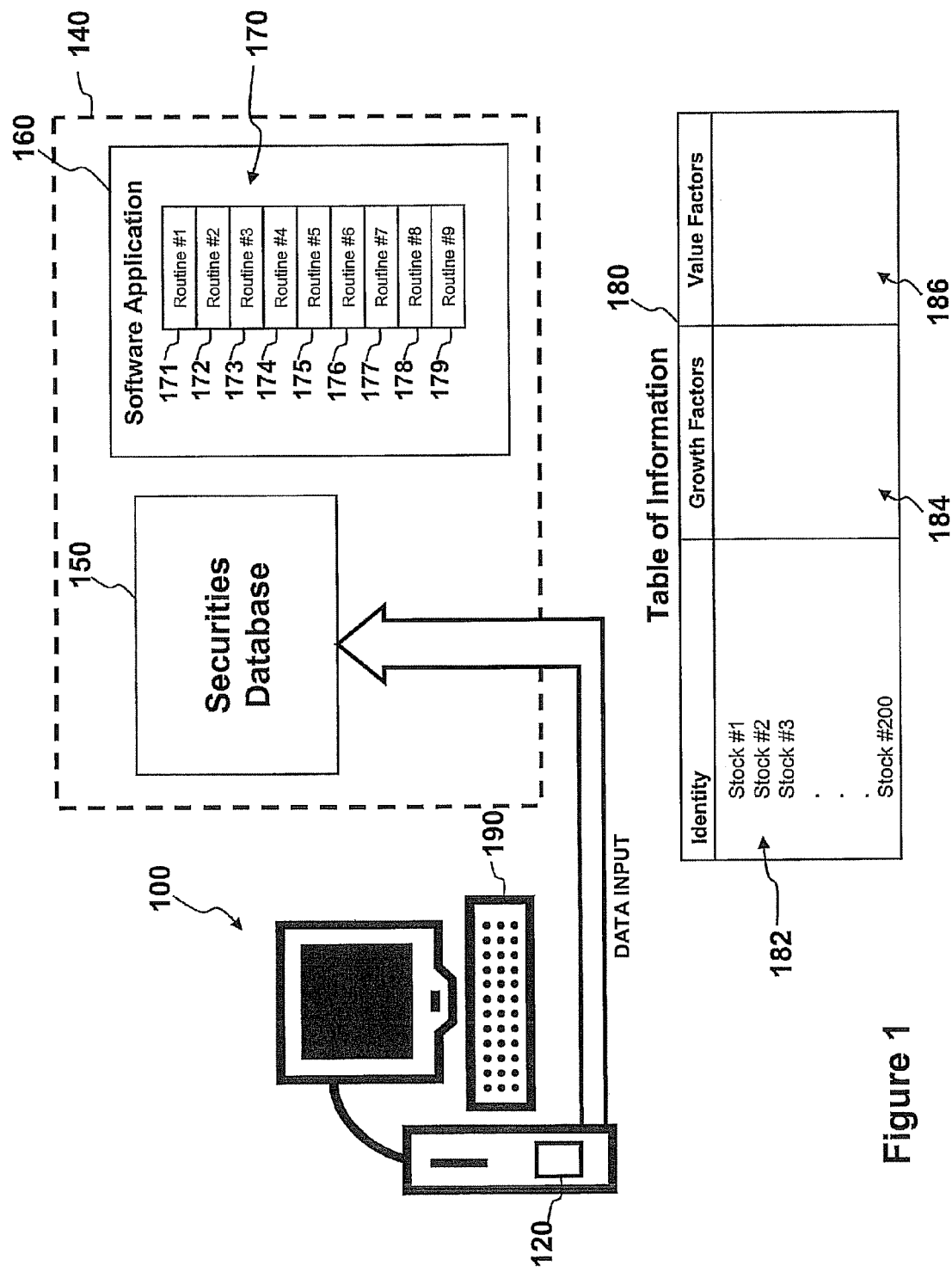
FIG. 1 is a block diagram of a structure embodiment according to the present invention.

Referring now to FIG. 1, a securities database 150 receives and stores data using a computing system 100 (e.g., a conventional personal computer standing alone or connected to a server (not shown)). Computing system 100 comprises at least a processor 120 and a memory 140. Memory 140 stores both securities database 150 and a computer software application 160. Computer software application 160 comprises a plurality of instruction routines 170, which are executed by processor 120 to carry out particular steps in the method of the presently described technology. Processor 120 may be contained within a single computer system such as system 100, or distributed among multiple computer systems. Likewise, database 150 may be contained within a single computer system such as system 100, or distributed among multiple computer systems.

Data may be manually entered into database 150 via (1) keyboard 190, which is operatively connected to processor 120, (2) downloaded from an internet server (not shown), or (3) transferred from a local storage medium (not shown), for example. The data which is input to and stored in database 150 may include the names of, or a representation of, an initial selection of stocks, such as stocks selected by one or more fund managers.

For example, the largest 200 domestic stocks can be stored in database 150. As another example, the largest 200 international stocks can be stored in database 150. As used in this specification, "domestic stocks" are stocks of companies listed on a U.S. exchange that are domiciled in the U.S., U.S. territories or possessions, or in certain tax havens such as Cayman Islands and Bermuda. "International stocks" are those stocks that are not domestic stocks. A data entry person can make use of a table 180, or the like, to key-in the data using keyboard 190, i.e. data entered by keyboard 190 is obtained by processor 120 and loaded into database 150. Table 180 includes a listing 182 of each of the entered stocks. Alternatively, the data may be downloaded into database 150 from another server or memory, or from a feed stream directly transmitted from a provider such as Standard & Poor's, for example.

The database 150 can store information identifying each stock it contains, such as the name and/or symbol of the stock. Other data relating to each stock as of the close on a selection date can also be entered and stored in database 150 in association with its respective stock name and/or symbol. Such other data may be taken from table 180, or the like, and includes growth data represented by a set of growth factors 184 and value data represented by a set of value factors 186 for each stock. Again, the data entry person may make use of table 180 to key-in the other data so as to store the other data in database 150, or such other data may be downloaded to database 150 for storage.

In accordance with at least one embodiment of the present technology, the growth factors 184 that are characteristic of the stocks in database 150 include, but are not limited to, all or some of: (1) 3-month price appreciation, (2) 6-month price appreciation, (3) 12-month price appreciation, (4) price-to-sales ratio and (5) 1-year sales growth. The value factors 186 that are characteristic of the stocks in database 150 in accordance with at least one embodiment of the present technology include, but are not limited to, all or some of: (1) price-to-book value ratio, (2) price-to-cash flow ratio and (3) return on assets.

"Price appreciation" refers to the increase in price per share over the designated time period (e.g., 3, 6 or 12 months). In accordance with one embodiment, the higher a stock's price appreciation, the better rank that stock gets in the ranking step of the present technology.

"Price-to-sales ratio," or P/S ratio, can be calculated, for example, by dividing the company's market capitalization (the number of shares multiplied by the share price) as of the close on the selection date by the company's total sales over the 12 months preceding the selection date. In accordance with one embodiment, the lower a stock's P/S ratio, the better rank that stock gets in the ranking step of the present technology. Like other ratios described herein, it can be calculated, equivalently, on a per-share basis. The calculation may be performed by processor 120 using component values entered into database 150, and such calculated factors may be stored in database 150. Alternatively, the calculated factors may be entered directly to the database 150 if they are pre-calculated by hand or machine, or are available from a data provider. Such pre-calculated factors would be seen at 184, 186 in table 180.

"1-year sales growth" is year over year change in the trailing 12 months of sales per share. In accordance with one embodiment, the higher a stock's 1-year sales growth, the better rank that stock gets in the ranking step of the present technology.

"Price-to-book value ratio," or P/B ratio is a financial ratio used to compare a company's current market price to its book value. It can be calculated by, for example, dividing the company's market capitalization as of the close on the selection date by the company's total book value from its balance sheet as of the close on the selection date. In accordance with one embodiment, the lower a stock's P/B ratio, the better rank that stock gets in the ranking step of the present technology.

"Price-to-cash flow ratio," or P/CF ratio, is a ratio used to compare a company's cash flow to its market value. It can be calculated by dividing the company's market capitalization as of the close on the selection date by the company's operating cash flow in the 12 months preceding the selection date. In accordance with one embodiment, the lower a stock's P/CF ratio, the better rank that stock gets in the ranking step of the present technology.

"Return on assets" (ROA) shows how efficient a company's assets are in generating profits. As used herein, ROA over the last four quarters, for example, can be measured by quarterly income, either before or after extraordinary items and less preferred dividends, divided by average assets value over the past four quarters. In accordance with one embodiment, the higher a stock's ROA percentage is, the better rank that stock gets in the ranking step of the present technology.

Figure 2:
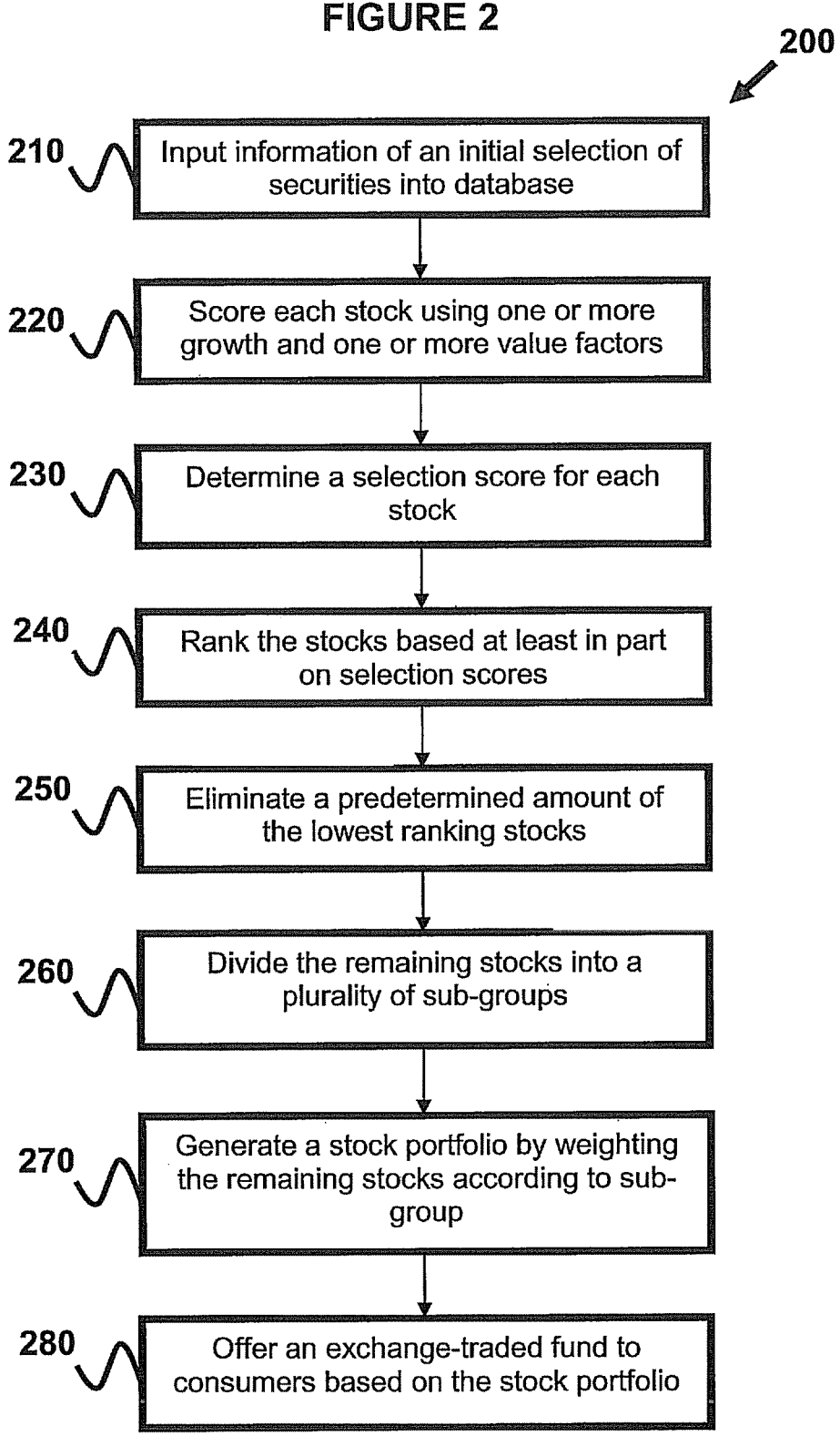
FIG. 2 is a schematic flow chart depicting the program flow of a software application in the structure of FIG. 1, according to one embodiment of the present invention.

Referring again to FIG. 1, software application 160 is executed by processor 120 in order to carry out all or some of program flow 200, as shown in FIG. 2, in accordance with one embodiment of the present technology.

Referring to FIG. 2, in step 210 of flow 200, information of an initial selection of securities is input into a database, such as database 150. The initial selection of securities may consist of either domestic or international stocks, as described above, and may be based at least in part on market capitalization. This step may be performed as described above in connection with FIG. 1, for example.

In step 220 of flow 200, each stock is scored using one or more growth and one or more value factors. In some embodiments, each stock may then be assigned one or more growth factor ranks and one or more value factor ranks. For example, each of 200 stocks may be ranked from 1 to 200 for each of 3-month price appreciation, 6-month price appreciation, 12-month price appreciation, 1-year sales growth, price-to-sales ratio, price-to-book ratio, price-to-cash flow ratio and return on assets. In some embodiments, a raw growth score may then be determined for each stock by summing the ranks of the growth factor rankings, and a raw value score may be determined for each stock by summing the ranks of the value factor rankings. Stocks may then be ranked separately on both their raw growth and raw value scores. A routine 171 (FIG. 1) may be called and executed by processor 120 (FIG. 1) so as to perform all or part of these steps. If a factor of a stock cannot be computed or used to rank a stock, that stock may be given the lowest possible ranking for that factor.

In step 230 of flow 200, a selection score is determined for each stock. The selection score may be based on the growth or value factor scores or rankings, the raw growth or raw value scores or rankings, or a combination thereof. In some embodiments, the selection score of a stock is set equal to the better of the raw growth ranking and the raw value ranking. In some embodiments, the selection score of a stock is set equal to the better of a final growth score and a final value score, wherein the final growth scores and final value scores are based on the ranks according to raw growth and raw value score, and on a quantitative style overlay. The quantitative style overlay is applied to determine the weighting factor given to growth and value models within a stock portfolio, and may operate by multiplying the raw growth and raw value score rankings by the appropriate weighting factors to determine each stock's final growth and final value score, respectively. The selection score may then be set equal to the better of the final growth and final value scores, or to the better of a ranking based on the final growth score and a ranking based on the final value score. A routine 172 (FIG. 1) may be called and executed by processor 120 (FIG. 1) so as to perform all or part of these steps. Calculated scores and/or rankings may be stored in database 150, for example.

In step 240 of flow 200, stocks are ranked based at least in part on selection scores. In some embodiments, each stock in the initial selection of stocks is ranked, for example from 1 to 200 based on its selection score. Various tie-breaking schemes will readily suggest themselves, such as giving a better ranking to a stock with a selection score that was set equal to its final value score than a stock with the same selection score, but where the selection score was set equal to its final growth score. A routine 173 (FIG. 1) may be called and executed by processor 120 (FIG. 1) so as to perform this step. Calculated rankings may be stored in database 150, for example.

In step 250 of flow 200, a predetermined amount of the lowest ranking stocks (ranked by selection score) are eliminated. For example, the lowest ranked 25% of stocks or the lowest ranked 50 stocks may be eliminated from the initial selection of securities. A routine 174 (FIG. 1) may be called and executed by processor 120 (FIG. 1) so as to perform this step.

In step 260 of flow 200, the remaining stocks are divided into a plurality of sub-groups. For example, the remaining stocks may be divided into sub-groups based on their selection score rankings. As another example, the remaining stocks may be divided into sub-groups based on their raw growth and/or raw value scores and/or rankings. In some embodiments, the stocks are divided into quintiles. A routine 175 (FIG. 1) may be called and executed by processor 120 (FIG. 1) so as to perform this step.

In step 270 of flow 200, a stock portfolio is generated by weighting the remaining stocks according to sub-group. The sub-groups containing higher ranking or scoring stocks may receive more weight within the stock portfolio, and each stock within a sub-group is equally weighted. Where the sub-groups are quintiles, for example, the top ranked quintile may receive 5/15 (33.3%) of the stock portfolio weight, with successful quintiles receiving 4/15 (26.7%), 3/15 (20.0%), 2/15 (13.3%) and 1/15 (6.7%), respectively, with stocks being equally weighted within each quintile. A routine 176 (FIG. 1) may be called and executed by processor 120 (FIG. 1) so as to perform this step.

In step 280 of flow 200, an exchange-traded fund is offered based on the stock portfolio generated in step 270. In some embodiments, the stocks in the stock portfolio can be rebalanced and reconstituted. At least a portion of the stocks may be rebalanced and reconstituted periodically, for example, on the last business day of each calendar quarter. According to certain embodiments, the stocks and their weights may be rebalanced and reconstituted on a quarterly selection date. The selected stocks and their weights in the stock portfolio can be rebalanced and reconstituted according to a proper daily index values calculation methodology. For example, the stock of an acquired company can be deleted from the stock portfolio at the close on the day the merger closes for both cash and stock deals. The acquired company's weight in the stock portfolio can be reallocated pro-rata among the remaining portfolio constituents, for example. For another example, in accordance with one embodiment, the stock of a spin-off is not included in the stock portfolio, and the value of the spin-off can be reallocated to its parent company.

Figure 3:
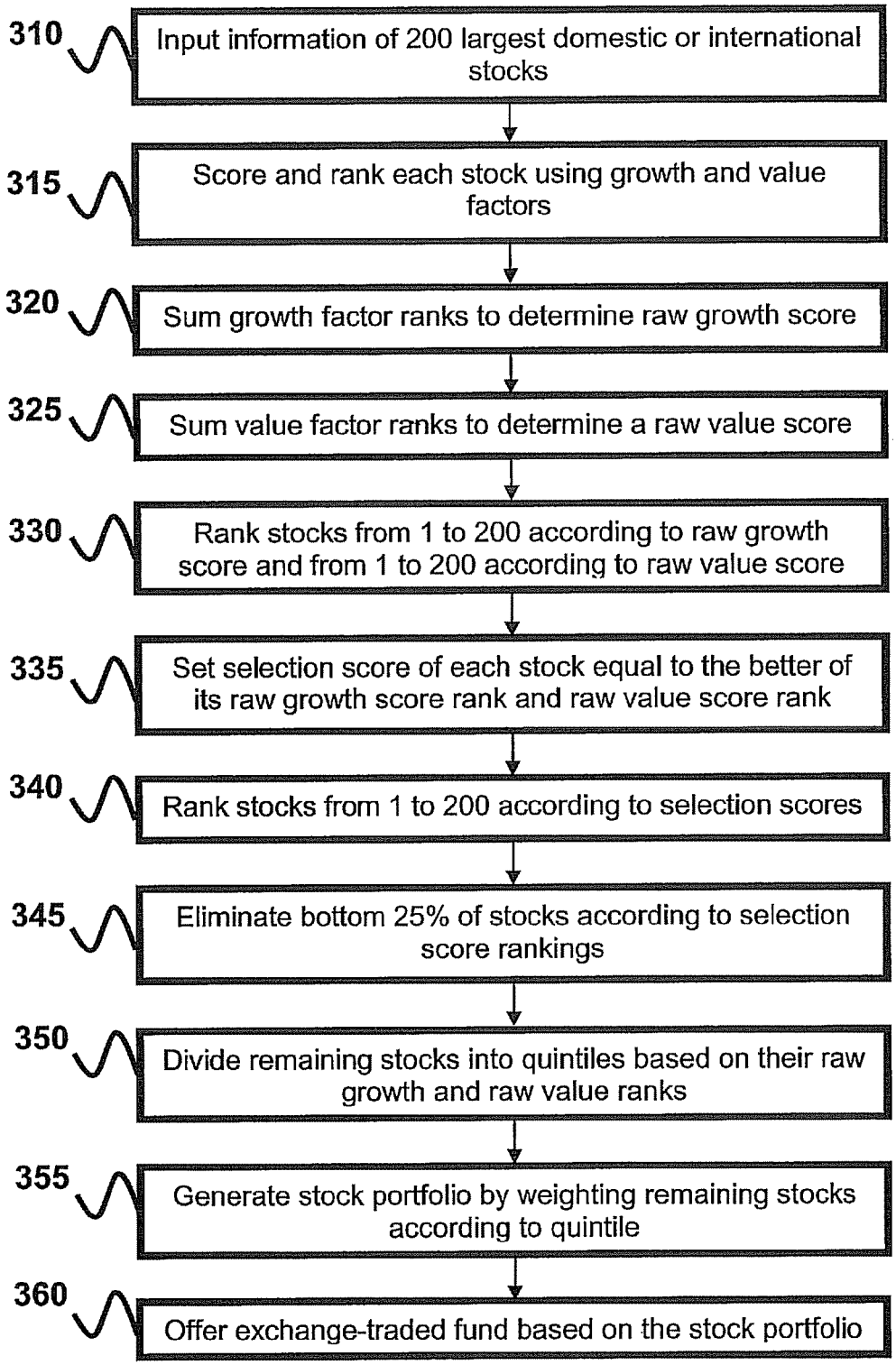
FIG. 3 is a schematic flow chart depicting the program flow of a software application in the structure of FIG. 1, according to a more specific embodiment of the present invention.

FIG. 3 shows a more specific embodiment of the present technology. Referring again to FIG. 1, software application 160 is executed by processor 120 in order to carry out a program flow 300, as shown in FIG. 3.

Referring to FIG. 3, in step 310 of flow 300, information of the largest (by market capitalization) 200 domestic or international stocks is input into a database, such as database 150. As noted above for this specification, "domestic stocks" are stocks of companies listed on a U.S. exchange that are domiciled in the U.S., U.S. territories or possessions, or in certain tax havens such as Cayman Islands and Bermuda, and "international stocks" are those stocks that are not domestic stocks. The input information corresponds to the information as of the close of trading on a selection date, such as the last business day of a calendar quarter. This step may be performed as described above in connection with FIG. 1, for example.

In step 315 of flow 300, each of the 200 stocks from step 310 is scored and ranked according to growth factors and value factors. In this embodiment, growth factors are 3, 6 and 12-month price appreciation, 1-year sales growth and price-to-sales ratio, and value factors are price-to-book ratio, price-to-cash flow ratio and return on assets. Thus, each stock has five growth factor scores, five growth factor ranks, three value factor scores, and three value factor ranks. A routine 171 (FIG. 1) may be called and executed by processor 120 (FIG. 1) so as to perform this step.

In step 320 of flow 300, the five growth factor ranks are summed for each stock to determine a raw growth score for that stock. For example, if a stock is ranked 21 for 3-month price appreciation, 25 for 6-month price appreciation, 17 for 12-month price appreciation, 89 for 1-year sales growth, and 117 for price-to-sales ratio, its raw growth score would be 269(=21+25+17+89+117). A routine 172 (FIG. 1) may be called and executed by processor 120 (FIG. 1) so as to perform this step.

In step 325 of flow 300, the three value factor ranks are summed for each stock to determine a raw value score for that stock. For example, if a stock is ranked 124 for price-to-book ratio, 135 for, price-to-cash flow ratio, and 72 for return on assets, its raw value score would be 331(=124+135+72). A routine 173 (FIG. 1) may be called and executed by processor 120 (FIG. 1) so as to perform this step.

In step 330 of flow 300, each stock is ranked from 1 to 200 according to raw growth score and from 1 to 200 according to raw value score. A routine 174 (FIG. 1) may be called and executed by processor 120 (FIG. 1) so as to perform this step.

In step 335 of flow 300, the selection score of each stock is set equal to the better of its raw growth score rank and its raw value score rank. Alternatively, in some embodiments, a quantitative style overlay may be applied at the beginning of, or prior to, this step. The quantitative style overlay determines the weighting factor given to growth and value models within a stock portfolio, and may operate by multiplying the raw growth and raw value score rankings by the appropriate weighting factors to determine each stock's final growth and final value score, respectively. The selection score may then instead be set equal to the better of the final growth and final value scores, or to the better of a ranking based on the final growth score and a ranking based on the final value score. A routine 175 (FIG. 1) may be called and executed by processor 120 (FIG. 1) so as to perform any of these steps.

In step 340 of flow 300, stocks are ranked from 1 to 200 according to their selection scores. A routine 176 (FIG. 1) may be called and executed by processor 120 (FIG. 1) so as to perform this step.

In step 345 of flow 300, the bottom 25% of stocks are eliminated based on selection score rankings (i.e. the lowest/worst ranked 50 stocks are eliminated from the initial 200). A routine 177 (FIG. 1) may be called and executed by processor 120 (FIG. 1) so as to perform this step.

In step 350 of flow 300, the remaining (top 75%, or 150) stocks are divided into quintiles based on raw growth and raw value ranks. For example, the top quintile of the remaining 150 stocks (i.e. the top 30 remaining stocks) may be grouped together as a result of those stocks having the highest raw growth rank, the highest raw value rank, or the highest selection score (which is based on raw growth and/or value rank or score). A routine 178 (FIG. 1) may be called and executed by processor 120 (FIG. 1) so as to perform this step.

In step 355 of flow 300, a stock portfolio is generated by weighting the remaining 150 stocks according to quintile. For example, the top ranked quintile may receive 5/15 (33.3%) of the stock portfolio weight, with successful quintiles receiving 4/15 (26.7%), 3/15 (20.0%), 2/15 (13.3%) and 1/15 (6.7%), respectively. Stocks are equally weighted within each quintile. Thus, for example, the 30 top-ranked stocks would, overall, have a 33.3% weight of the stock portfolio, the next 30 stocks would have an overall 26.7% weight of the stock portfolio, etc. A routine 179 (FIG. 1) may be called and executed by processor 120 (FIG. 1) so as to perform this step.

In step 360 of flow 300, an exchange-traded fund is offered based on the stock portfolio. In some embodiments, the stocks in the stock portfolio can be rebalanced and reconstituted, as described above in connection with FIG. 2, for example.

While the present technology has been described with reference to certain embodiments, it will be understood by those skilled in the art that various changes may be made and equivalents substituted without departing from the scope of the invention. In addition, many modifications may be made to adapt to a particular situation or material to the teachings of the invention without departing from its scope. Therefore, it is intended that the invention not be limited to the particular embodiment disclosed.

The invention claimed is:

1. A method for selecting and weighting securities for an actively managed exchange-traded fund using a computer system, comprising the steps of:
    (1) inputting information of an initial selection of securities into a database, wherein the information comprises identity, growth data, and value data of each stock in the initial selection of securities as of a selection date, wherein the initial selection of securities consists of one of domestic stocks and international stocks, and wherein the initial selection of securities is selected based at least in part on market capitalization;
    (2) processing data in said database for scoring each of the stocks in said database using a plurality of growth and value factors to generate one or more growth scores and one or more value scores for each stock, wherein said processing data in said database for scoring each of the stocks comprises:
    assigning a growth rank to each stock for each growth factor;
    assigning a value rank to each stock for each value factor;
    summing up all growth ranks of each stock to generate a raw growth score for each stock;
    ranking the stocks based on raw growth scores;
    summing up all value ranks of each stock to generate a raw value score for each stock; and
    ranking the stocks based on raw value scores;
    (3) processing data in said database for determining a selection score for each stock, wherein said processing data in said database for determining a selection score for each stock comprises:
    setting the selection score of each stock equal to the better of a final growth score and a final value score, wherein the final growth scores are based on the raw growth score ranks and a quantitative style overlay, and wherein the final value scores are based on the raw value score ranks and the quantitative style overlay;
    (4) processing data in said database for ranking the stocks in the initial selection of securities based at least in part on the selection scores;
    (5) processing data in said database for eliminating a predetermined amount of the lowest ranking stocks;
    (6) processing data in said database for dividing the remaining stocks into a plurality of sub-groups;
    (7) processing data in said database for generating a stock portfolio by weighting the remaining stocks according to the sub-groups they are in, wherein each stock is equally weighted within its sub-group;
    (8) offering an exchange-traded fund to consumers based on the stock portfolio; and
    wherein at least one of steps (2)-(7) is performed by the computer system.

2. The method of claim 1, wherein the plurality of growth factors are selected from the group consisting of price appreciations, 1-year sales growth and price-to-sales ratio, and wherein the plurality of value factors are selected from the group consisting of price-to-book ratio, price-to-cash flow ratio and return on assets.

3. The method of claim 1, wherein the plurality of growth factors comprise 3-month price appreciation, 6-month price appreciation, 12-month price appreciation, 1-year sales growth and price-to-sales ratio, and wherein the plurality of value factors comprise price-to-book ratio, price-to-cash flow ratio and return on assets.

4. The method of claim 1, wherein the predetermined amount of the lowest ranking stocks to be eliminated is the bottom 25%.

5. The method of claim 1, further comprising the step of reconstituting and rebalancing the stocks in the stock portfolio periodically.

6. The method of claim 1, wherein step (2) comprises:
    assigning a growth rank to each stock for each growth factor;
    assigning a value rank to each stock for each value factor;
    summing up all growth ranks of each stock to generate a raw growth score for each stock;
    ranking the stocks based on raw growth scores;
    summing up all value ranks of each stock to generate a raw value score for each stock;
    ranking the stocks based on raw value scores;
    and wherein step (3) comprises:

setting the selection score of each stock equal to the better of its raw growth score rank and its raw value score rank.

7. The method of claim 6, wherein step (6) includes dividing the remaining stocks into sub-groups based on at least one of raw growth ranks, raw value ranks and selection score ranks.

8. The method of claim 7, wherein the sub-groups are quintiles, and wherein the top ranked quintile of remaining stocks receives 5/15 of the weight within the stock portfolio, with successive quintiles of remaining stocks receiving 4/15, 3/15, 2/15 and 1/15 of the weight within the stock portfolio, respectively.

9. The method of claim 1, wherein the initial selection of securities is selected from a group consisting of (i) the 200 largest domestic stocks based on market capitalization and (ii) the 200 largest international stocks based on market capitalization.

10. The method of claim 1, wherein at least each of steps (2)-(7) is performed by the computer system.

11. The method of claim 6, wherein the initial selection of securities is selected from a group consisting of (i) the 200 largest domestic stocks based on market capitalization and (ii) the 200 largest international stocks based on market capitalization,
wherein the plurality of growth factors comprise 3-month price appreciation, 6-month price appreciation, 12-month price appreciation, 1-year sales growth and price-to-sales ratio,
wherein the plurality of value factors comprise price-to-book ratio, price-to-cash flow ratio and return on assets,
wherein the predetermined amount of the lowest ranking stocks to be eliminated is the bottom 25%,
wherein step (6) includes dividing the remaining stocks into quintiles based on at least one of raw growth ranks, raw value ranks and selection score ranks, and
wherein the top ranked quintile of remaining stocks receives 5/15 of the weight within the stock portfolio with successive quintiles of remaining stocks receiving 4/15, 3/15, 2/15 and 1/15 of the weight within the stock portfolio, respectively;
and further comprising the step of reconstituting and rebalancing the stocks in the stock portfolio periodically.

12. A computing system for selecting and weighting securities for an actively managed exchange-traded fund, the computing system comprising a processor and a memory storing a set of instructions adapted to be executed by the processor, the set of instructions being arranged to:
(1) store information of an initial selection of securities in a database, wherein the information comprises identity, growth data, and value data of each stock in the initial selection of securities as of a selection date, wherein the initial selection of securities consists of one of domestic stocks and international stocks, and wherein the initial selection of securities is selected based at least in part on market capitalization;

(2) score each of the stocks in said database using a plurality of growth and value factors to generate one or more growth scores and one or more value scores for each stock, wherein, in scoring each of the stocks in said database, the set of instructions are arranged to:
assign a growth rank to each stock for each growth factor;
assign a value rank to each stock for each value factor;
sum up all growth ranks of each stock to generate a raw growth score for each stock;
rank the stocks based on raw growth scores;
sum up all value ranks of each stock to generate a raw value score for each stock;
rank the stocks based on raw value scores;

(3) determine a selection score for each stock wherein, in determining the selection score, the set of instructions are arranged to set the selection score of each stock equal to the better of a final growth score and a final value score, wherein the final growth scores are based on the raw growth score ranks and a quantitative style overlay, and wherein the final value scores are based on the raw value score ranks and the quantitative style overlay;

(4) rank the stocks in the initial selection of securities based at least in part on selection scores;

(5) eliminate a predetermined amount of the lowest ranking stocks;

(6) divide the remaining stocks into a plurality of sub-groups; and (7) generate a stock portfolio by weighting the remaining stocks according to the sub-groups they are in, wherein each stock is equally weighted within its sub-group.

13. The computing system of claim 12, wherein the plurality of growth factors are selected from the group consisting of price appreciations, 1-year sales growth and price-to-sales ratio, and wherein the plurality of value factors are selected from the group consisting of price-to-book ratio, price-to-cash flow ratio and return on assets.

14. The computing system of claim 12, wherein the set of instructions stored in the memory, when executed by the processor to perform step (2), is further arranged to:
assign a growth rank to each stock for each growth factor;
assign a value rank to each stock for each value factor;
sum up all growth ranks of each stock to generate a raw growth score for each stock;
rank the stocks based on raw growth scores;
sum up all value ranks of each stock to generate a raw value score for each stock;
rank the stocks based on raw value scores;
and wherein the set of instructions stored in the memory, when executed by the processor to perform step (3), is further arranged to:
set the selection score of each stock equal to the better of its raw growth score rank and its raw value score rank.

* * * * *